US011059727B2

(12) United States Patent
Vaughan

(10) Patent No.: US 11,059,727 B2
(45) Date of Patent: Jul. 13, 2021

(54) FLUID TREATMENT TANK HAVING AIR BLOCKER

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 590 days.

(21) Appl. No.: 15/825,348

(22) Filed: Nov. 29, 2017

(65) Prior Publication Data

US 2019/0161363 A1 May 30, 2019

(51) Int. Cl.
| | | |
|---|---|---|
| *C02F 1/00* | (2006.01) | |
| *C02F 1/28* | (2006.01) | |
| *C02F 1/68* | (2006.01) | |
| *C02F 1/74* | (2006.01) | |
| *C02F 7/00* | (2006.01) | |
| *C02F 101/20* | (2006.01) | |
| *C02F 101/10* | (2006.01) | |

(52) U.S. Cl.
CPC .............. *C02F 1/001* (2013.01); *C02F 1/006* (2013.01); *C02F 1/281* (2013.01); *C02F 1/68* (2013.01); *C02F 1/74* (2013.01); *C02F 7/00* (2013.01); *C02F 1/004* (2013.01); *C02F 2101/101* (2013.01); *C02F 2101/203* (2013.01); *C02F 2201/005* (2013.01); *C02F 2209/03* (2013.01); *C02F 2301/066* (2013.01); *C02F 2303/14* (2013.01)

(58) Field of Classification Search
CPC .......... C02F 1/001; C02F 1/004; C02F 1/006; C02F 1/281; C02F 1/74; C02F 7/00; C02F 2101/101; C02F 2101/203; C02F 2201/005; C02F 2209/03; C02F 2301/066; C02F 2303/14; B01D 24/38; B01D 24/402; B01D 35/14; B01D 35/147; B01D 35/1475

See application file for complete search history.

(56) References Cited

U.S. PATENT DOCUMENTS

| | | |
|---|---|---|
| 5,919,373 A | 7/1999 | Naaktgeboren |
| 7,300,569 B2 | 11/2007 | Petty |
| 7,491,321 B1 | 2/2009 | Maas et al. |
| 7,927,488 B1 | 4/2011 | Wilfong |
| 8,500,999 B2 | 8/2013 | Tischendorf et al. |
| 8,691,091 B2 | 4/2014 | Prescott |
| 9,290,397 B2 | 3/2016 | Prescott |
| 9,701,554 B2 | 7/2017 | Prescott |

(Continued)

OTHER PUBLICATIONS

CSI Water Treatment Systems, Sidekick Single Tank Aeration Filter, 2016, p. 1.

(Continued)

*Primary Examiner* — Lucas A Stelling
(74) *Attorney, Agent, or Firm* — Boyle Fredrickson S.C.

(57) ABSTRACT

A fluid treatment tank for an aeration filter has an air blocker separating a chamber in fluid communication with a control valve of the filter from a pocket of air above the liquid in the tank and the control valve. The air blocker contains a volume of liquid that acts as a trap that prevents or at least inhibits air in the pocket from backing up into the chamber. Contact between the control valve and air is dramatically reduced. The air blocker may comprise a baffle that directs any air flowing through the air blocker downwardly and then back upwardly before the air can escape the air blocker.

18 Claims, 3 Drawing Sheets

(56) References Cited

U.S. PATENT DOCUMENTS

2003/0173304 A1\* 9/2003 David Joslin .......... B01D 24/14
 210/702
2015/0101992 A1\* 4/2015 Prescott .................... C02F 1/68
 210/758

OTHER PUBLICATIONS

Kinetico Incorporated, Kinetico 9610 Owner's Manual, Product No. 9613A, Jul. 2005, p. 1.
Clearion Water Technologies, 360P Series Single Tank Aeration, Before Nov. 29, 2017, p. 1.

\* cited by examiner

FLUID TREATMENT TANK HAVING AIR BLOCKER

BACKGROUND OF THE INVENTION

1. Field of the Invention

The invention generally relates to fluid treatment tanks and, more particularly, to a tank that is used, for example, in a system operable in an aeration filtration mode and having an internal air blocker that prevents air from undesirably entering a control valve that is coupled to the tank. The invention additionally relates to a method of operating such a system.

2. Discussion of the Related Art

Fluid treatment tanks are widely used in a variety of water treatment systems. These tanks typically are known as "pressure vessels" because the fluid may be pressurized, albeit usually at a low pressure. The typical water treatment tank is a hollow cylindrical structure the interior of which stores a filter media, typically supported on a support bed or a distributor plate, and a volume of water extending above the upper surface of the filter media. A riser tube may be centrally positioned within the tank. The typical riser tube extends from beneath the filter media to an upper opening in the tank. The tank may include a blow-molded plastic tank liner reinforced by an outer layer of fiberglass wrap. Fluid flow into and out of the tank is controlled by an electronically actuated multi-port, multi position control valve, typically mounted on top of the tank above the opening.

Water treatment systems having such fluid treatment tanks are being used with increasing frequency in an aeration filtration mode. Systems operating in this mode often are referred to as "aeration filters", "air over water filters", or "air induction filters." The fluid treatment tank can be used either as a dedicated air induction filter or as part of a water conditioning system having a water softener, a UV filter, and/or other water conditioning systems or devices located in-line with the aeration filter. In this mode of operation, a pressurized volume or "head" of air is trapped in an air pocket located above water in the tank, and the oxygen in the air reacts with oxidizable substances such as iron, sulfur, and volatile organic compounds (VOC) that are entrained in the water. The filter media then traps the oxidized substances. The trapped air is periodically purged from the system and replenished with fresh air via operation of the control valve.

Aeration filtration is very effective and simple, but can shorten the life of the associated control valve. This is because the control valve typically is exposed to the trapped air at all times. Water flowing into the tank from the valve during filtration flows through the trapped air within the valve, where it oxidizes compounds entrained in the trapped air, especially iron oxide and hydrogen sulfide. These compounds precipitate into the valve, eventually clogging the valve.

The deleterious effects of aeration filtration on control valves has been recognized, and measures have been taken to isolate the system's control valve from the air in the top of the tank. For example, Clearon Water Technologies of Ashland, Ohio has introduced a single-tank aeration filter, dubbed the "Sidekick", in which the control valve is mounted not on top of the fluid treatment tank but instead on a tube arrangement located beside the fluid treatment tank. The tube arrangement has nested inner and outer tubes that both are connected at their lower end to the bottom of the fluid treatment tank. A separate air injector is provided for periodically injecting air into the bottom of the fluid treatment tank. The top of the tube arrangement is located beneath the level of the water in the fluid treatment tank, preventing air from being trapped between the control valve and the water in the tube assembly.

The Sidekick works at least reasonably well, but is bulky because it requires the provision of a separate tube assembly beside the fluid treatment tank, as well as a separate air injection tube. The requirement for these additional tubes and their associated fittings also adds considerable cost to the system and also increases the risk of system leaks and ruptures.

The need therefore has arisen to provide a fluid treatment tank for an aeration filtration system that incorporates internal measures to isolate the system's control valve from air in the tank.

The need additionally has arisen to provide a fluid treatment tank that has such internal measures and that is relatively inexpensive to produce and assemble.

The need additionally has arisen to provide a fluid treatment tank that has such internal measures and that does not appreciably increase the size, and especially the footprint, of the tank.

BRIEF DESCRIPTION

In accordance with a first aspect of the invention, one or more of the above-identified needs is met by providing a fluid treatment tank having an internal air blocker separating a chamber in fluid communication with an associated control valve from a pocket of pressurized air located above the liquid in the tank. The air blocker contains a volume of liquid that acts as a trap that prevents or at least inhibits air in the pocket from backing up into the chamber during, for example, periods between service cycles. Contact between untreated liquid in the control valve and air thereby is dramatically reduced.

The air blocker may comprise a baffle that directs any air flowing therethrough downwardly and then back upwardly before the air can escape the air blocker. In one embodiment, the air blocker comprises a cup having a peripheral wall that surrounds the fluid treatment tank's riser tube and that supports a volume of liquid, and the baffle comprises a tubular structure that is positioned radially between the peripheral wall of the cup and the riser tube and that extends downwardly into the volume of liquid from above.

The air blocker may be formed of an assembly of plastic components this is mounted within the fluid treatment tank as a pre-formed unit.

In accordance with another aspect of invention, a method of inhibiting airflow into a control valve of an aeration filter from a treatment tank of the filter comprises trapping a volume of liquid in a flow path connecting a volume of air in the treatment tank to the control valve.

The method may additionally comprise permitting liquid to enter the fluid treatment tank by passing downwardly past a baffle extending into the volume of liquid, then upwardly past the baffle, and into the treatment tank.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present inven-

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Air blockers constructed in accordance with the invention could be used in a variety of tanks used in aeration filters configured to treat a variety of liquids using any of a number of filter media. Hence, while preferred embodiments of the invention now will be described in conjunction with a treatment tank of a water treatment system having an aeration filter modality, it is to be understood that the invention is not so limited.

Figure 1A:
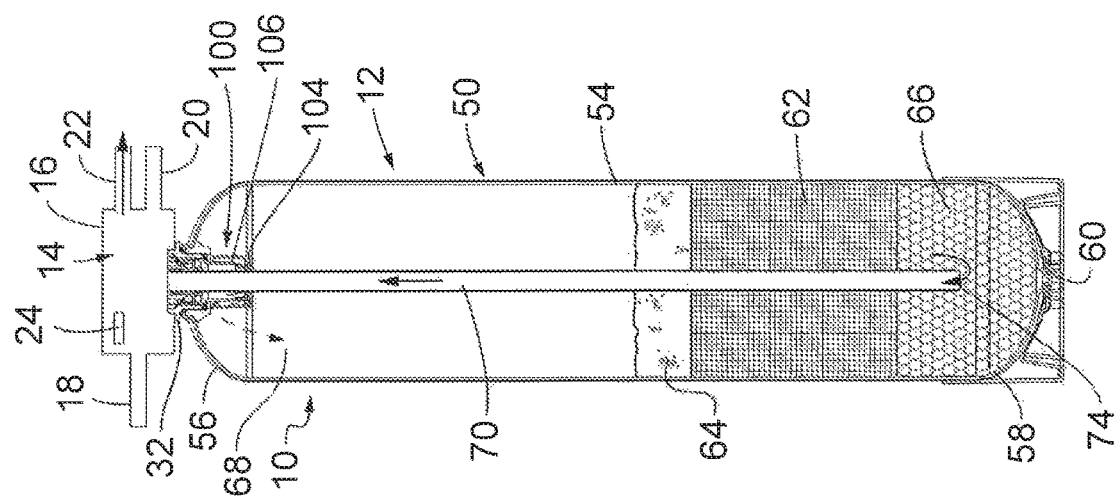
FIG. 1A is a somewhat schematic sectional side elevation view of a portion of an aeration filter including a fluid treatment tank having an internal air blocker according to an embodiment of the present invention and showing the system in a first, service, mode of operation in which source water is subject to aeration filtration.
Figure 1B:
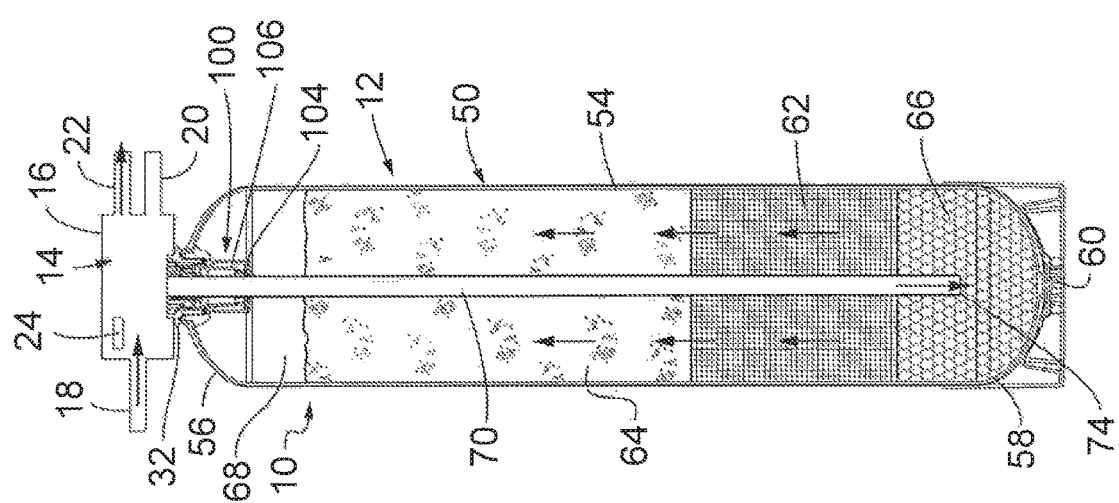
FIG. 1B is a somewhat schematic sectional side elevation view of the portion of the aeration filter shown in FIG. 1A, showing the system in a second, backwash or air purge, mode of operation in which air is being purged from the fluid treatment tank.
Figure 1C:
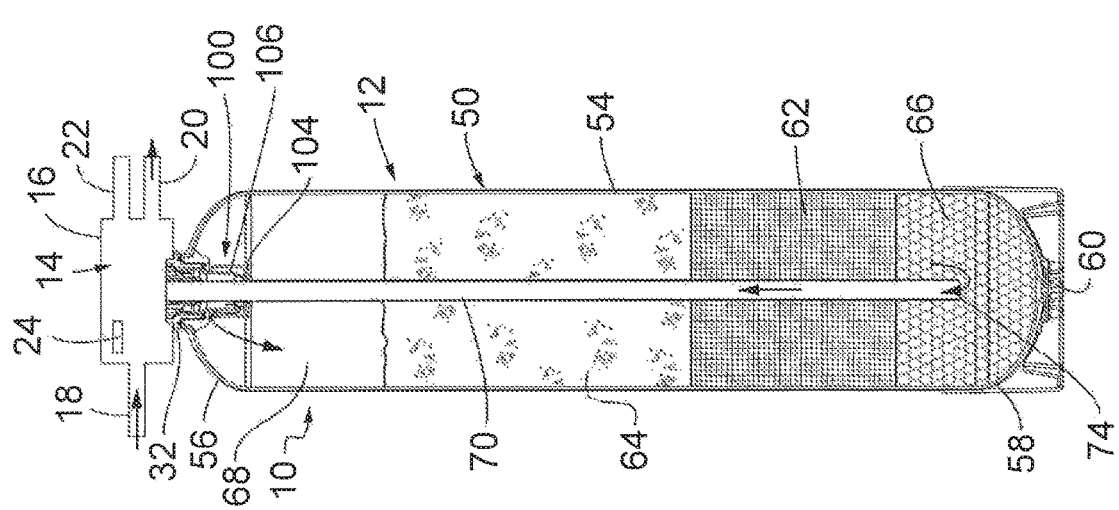
FIG. 1C is a somewhat schematic sectional side elevation view of the portion of the aeration filter shown in FIGS. 1A and 1B, showing the system in a third, intake, mode of operation in which fresh air is being supplied to the fluid treatment tank.

Referring now to the drawings and, initially, to FIG. 1A-1C, a portion of an aeration filter 10 is illustrated. The aeration filter 10 is configured to treat "source" water that may be tap water or any other water that could be benefitted by aeration filtration. The source water may be supplied from a main connected to a municipal or private water source or from a tank. "Aeration filtration" as used herein means the reaction of oxidizable substances in the source liquid (water in this example) with oxygen in air. Such oxidizable substances include, but are not limited to, iron, hydrogen sulfide, and volatile organic compounds. The aeration filter 10 includes at least a water treatment tank 12 and a control valve 14 which, in this embodiment, is mounted on top of the water treatment tank 12. The tank 12 is fitted with an air blocker 100 constructed in accordance with the invention. The filter 10 may be a standalone filter or may be used in combination with other systems or devices such as a water softener, a UV filter, or any of a number of other filters.

Figure 2:
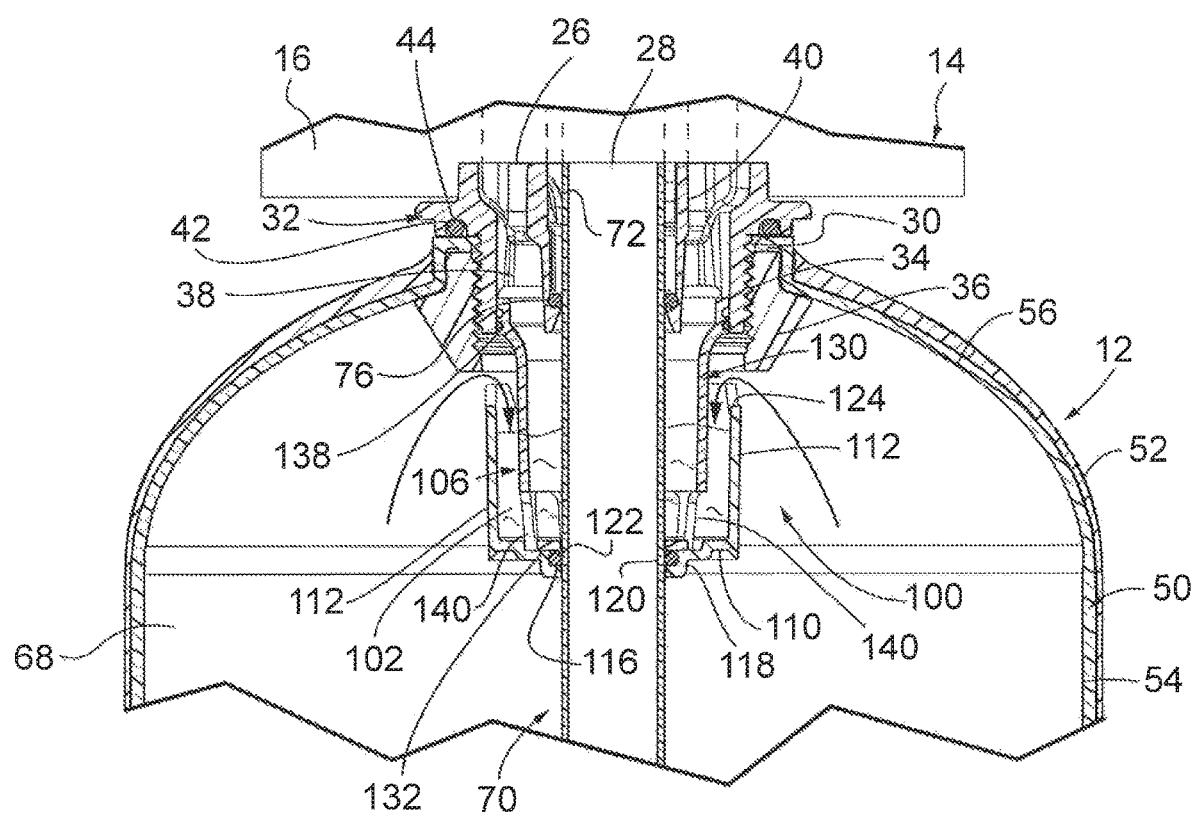
FIG. 2 is a somewhat schematic sectional fragmentary elevation view of an upper end portion of the fluid treatment tank of the aeration filter shown in FIGS. 1A-1C, showing the blocking of airflow by the air blocker.

Still referring to FIGS. 1A-1C, the control valve 14 is an electronically actuated, multi-port, multi-position valve. It is contained in housing 16 having ports for a source water inlet 18, a treated water outlet 20, a drain 22, and an air inlet port 24. As discussed in more detail below, the air inlet port 24 may be connected directly to the atmosphere in an induction-based filter or to the outlet of a pump in a pressurized filter. Referring to FIG. 2, the housing 16 also has first and second inlet/outlet ports 26 and 28 opening into the interior of the treatment tank 12. In the illustrated embodiment in which the control valve 14 is mounted on top of the treatment tank 12 over an upper opening 30 in the tank 12, the first and second inlet/outlet ports comprises first and second downwardly-facing ports opening into a fitting 32, with the first port 26 being an annular port surrounding the second port 28. Internal valving within the control valve 14 selectively couples the various ports to one another, depending on the then-prevailing modality of the filter 10. The control valve 14 may be electronically controlled based on time or sensed conditions such as the state of the filter media in the tank 12 and/or the quality of the treated water exiting the control valve. A suitable control valve is available from Clack Corporation of Windsor Wisconsin under the "WS" series.

Still referring to FIG. 2, the control valve 14 of this embodiment is mounted on top of the tank 12 via a fitting 32. Fitting 32 includes a threaded boss 34 that that threads into an injection molded plastic insert 36 opening into the upper opening 30 in tank 12. The area 38 within the boss 34 that is in communication with the first inlet/outlet port 26 can be considered a chamber that fluidically connects the interior of the tank 12 to the port 26. A tube 40 is located concentrically within the boss 34 in communication with the second inlet/outlet port 28. A circular flange 42 supports the upper end of the boss 34 on the tank and is sealed against the upper end of tank 12 by a seal 44.

Referring again to FIGS. 1A-1C and 2, the treatment tank 12 comprises a tank liner 50 wrapped in a reinforcing layer 52 of fiberglass (FIG. 2) to make the tank 12 usable as a pressure vessel. The tank liner 50 is made of a thermoplastic material such as blow-molded high-density polyethylene (HDPE). Liner 50 includes a generally cylindrical hollow body or wall 54 and upper and lower generally semi-spherical top and bottom ends 56 and 58. A feature 60 is integrally molded to the bottom of end 58 to rotationally couple the liner 50 to the filament winding machine during the fiberglass winding process. The liner 50 may have an internal diameter of, for example, 8 in. to 16 in. and a height of 3-6 feet.

Still referring to FIGS. 1A-1C, a filter media bed 62 is stored in the bottom of the tank 12 within and beneath water 64, which water is at level above the top of the filter media bed 62. This filter media may be tailored to remove one or more oxidized substances from the water 64 in the tank 12. For example, if tailored to remove iron, the filter media may comprise an admixture of a manganese dioxide-coated pumicite marketed under the name Birm® and an aluminum silicate marketed under the name Filter-Ag®, both available from Clack Corporation of Windsor, Wis. The filter media bed 62 may be separated from the bottom of the tank 12 by a distributor plate (not shown) and/or a support bed 66 of an inert underbedding material such a mixture of gravel/quartz and garnet.

As mentioned briefly above, a volume or "head" of air is trapped in a pocket 68 above the water 64 overlying the filter media bed 62 during aeration filtration. This air is typically at a non-minimal post-atmospheric pressure that depends on the line pressure that supplies source water to the tank 12. This pressure typically is on the order of 20 to 125 psi and more typically of about 40 to 70 psi. The water depth during a service cycle and thus the depth of the air pocket 68 typically is determined by the ratio of atmospheric pressure to water line pressure. However, if air is pumped into the tank 12 under pressure rather than being inducted into the tank via a venturi, the air pocket 64 may be between ¼ and ⅓ of the tank height. This assumes the presence of a filter media bed in the tank. That might not be the case in some systems having separate tanks for air and filter media. In those systems, the tank will be full of air.

A riser tube 70 may be centrally positioned within the tank 12. Riser tube 70 includes an upper end 72 (FIG. 2) that extends into the bottom end of the tube 40 of fitting 32. The outer peripheral surface of the riser tube 70 is sealed to the tube 40 by an O-ring 76. The riser tube 70 also has a bottom opening 74. Depending on the design of the treatment tank, the opening 74 could be located in the support bed 66 or beneath a fluid-permeable but filtration media impermeable distributor plate (not shown) located near the bottom of the tank 12. A screen (not shown) also may be fitted over the bottom end of the riser tube 70 to inhibit underbedding or filter media from entering the opening 70.

Referring to FIG. 2, in accordance with an embodiment of the invention, an air blocker 100 is provided in an air flow path extending between the air pocket 68 and the chamber 38. The air blocker 100 contains a volume of water 102 through which air must pass to flow from the air pocket 68 to the chamber 38 or vice versa. Air can flow from the control valve 14, through this volume 102, into the air pocket 68 during an air intake operation in which fresh air is being supplied to the tank as detailed below in connection with FIG. 1C, but is inhibited from flowing back into the control valve 14 at all other times. Contact between the control valve 14 and air in the air pocket 68 thereby is dramatically reduced. In the illustrated embodiment in which the control valve 14 is mounted on top of a tank 12 having a riser tube 70, the air blocker 100 is mounted in a surrounding relationship with the riser tube 70.

Figure 3:
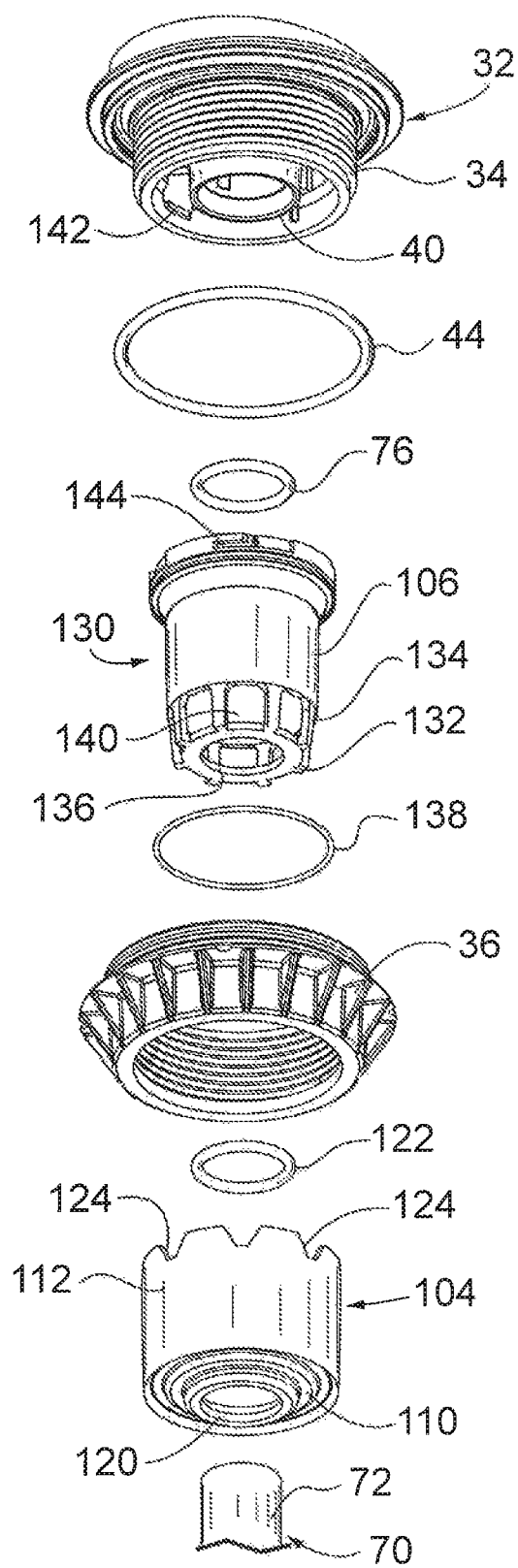
FIG. 3 is an exploded perspective view of the air blocker and related components of the fluid treatment tank of FIGS. 1A-2.

Referring now to FIGS. 2 and 3, the air blocker 100 of this embodiment comprises a cup 104 and a baffle 106 integrated into a single unit. Both components 104 and 106 may be formed of an injection molded plastic.

The cup 104 has an annular bottom wall 110 and a vertically extending outer peripheral wall 112. The bottom wall 110 is stepped to form an annular O-ring seat 116 and an annular shoulder 118. An inner periphery 120 of the bottom wall 110 of the cup 104 is sealed against the outer surface of the riser tube 70 via an O-ring 122 held in the seat 116. The outer peripheral wall 112 extends above the bottom wall 110 to a level beneath the top of the tank 12 as defined by the bottom of the insert 36, leaving a fluid flow path above an upper edge of the outer peripheral wall 112. The upper edge of the outer peripheral wall 112 contains notches 124 to facilitate fluid flow between the upper edge of the outer peripheral wall 112 and the lower surface of the insert 36. The bottoms of these notches 124 define a designated level formed by the surface of the water in the cup 104.

Still referring to FIGS. 2 and 3, the baffle 106 extends into the cup 104 from above to separate the chamber 38 from the air pocket 68. The baffle 106 thus defines a flow path that requires fluid entering the cup 104 from either direction to flow in a U-shaped path around the bottom surface of the baffle 106. The depth that the baffle 106 extends beneath the bottom of the notches 124 in the wall 112 and thus into the volume of water 102, or below the designated level as that term is defined above, can be considered the effective depth of the baffle 106. This depth need only be enough to form a seal. It can be as little as 0.25" or even less, but should more typically be 0.5" to 0.75" or more to permit the baffle 106 to function properly if, for example, the water does not fill quite to the designate height due, for example, to turbulent flow through the air blocker 100 and/or if the tank 12 is mounted on an inclined surface.

In the illustrated embodiment, the baffle 106 as illustrated in FIGS. 2 and 3 is formed as part of a cylindrical element 130 contained radially within the cup 104 and extending above the top of the peripheral wall 112 of the cup 104. The cylindrical element 130 has an annular floor 132 and a cylindrical wall 134 extending upwardly from the floor 132. The outer edge of the floor 132 is retained by the shoulder 118 in the bottom wall 110 of the cup 104. The floor 132 is attached to the upper surface of the bottom wall 110 of the cup 104, such as by sonic welding. The O-ring 122 is located in a space formed vertically between the bottom surface of the floor 132 and the upper surface of the bottom wall 110 of the cup 104. An inner peripheral surface 136 of the floor 132 surrounds the riser tube 70. The cylindrical element 130 extends above the upper edge of the outer peripheral wall 112 of the cup 104 and into the fitting 32 of the control valve 14, where it is sealed to the boss 34 of the fitting 32 via an O-ring 138. The cylindrical wall 134 has a number of circumferentially-spaced weirs or openings 140 disposed vertically between the bottom of the baffle 106 and the floor 132. The tops of these openings 140 define the bottom of the baffle 106. The upper end of the cylindrical element 130 is attached to the inner surface of the boss 34 of the control valve fitting 32 by a bayonet coupling formed from a tab 142 on the boss 34 and a stepped notch 144 formed in the upper edge of the cylindrical element 130.

Referring again to FIGS. 1A-1C, modalities pertinent to aeration filtration include filtration or service, shown in FIG. 1A, backwash or air purge, shown in FIG. 1B, and air intake, shown in FIG. 1C.

Referring initially to FIGS. 1A and 2, aeration filtration or "service" proceeds with a head of air trapped in pocket 68. The volume of water 102 is stored in the cup 104 at this time, with the surface of the volume extending above the bottom of the cylindrical baffle 106 as defined by the tops of the openings 140. Source water flows into the control valve 14 through the inlet port 18, through the control valve 14, and out of the control valve 14 through the first, outer inlet/outlet port 26 in the control valve. The water then flows downwardly through chamber 38, through the openings 140 and thus past the bottom of the baffle 106, upwardly through the annular passage formed between the peripheral wall 112 of the cup 104 and the baffle 106, and over the top of peripheral wall 112. With some variations due to splashing and turbulence, the volume of water in the cup 104 will remain generally unchanged during this flow as it is continuously replenished with the flowing source water. During service flow situations in which source water is supplied to the tank 12, the pressure is higher in chamber 38 than in air pocket 68, preventing air from entering chamber 38 from the air pocket 68. Oxidizable components in the source water are oxidized as the source water travels through the air pocket 68, and the oxidized matter is subsequently filtered out by the filtration media in the bed 62 as the water moves downwardly through the media. The now-filtered water then enters the bottom opening 74 of the riser tube 70, flows upwardly through the riser tube 70 and into the control valve 14 through the second, inner, inlet/outlet port 28, and out of the control valve 14 through the treated water outlet port 20.

During periods between service flow situations in which no source water is being supplied to the tank 12, the height of the pocket of water 102 creates a pressure barrier to the flow of that is dependent on the water depth. Specifically, since the water depth is measured in inches the pressure barrier is measured in inches of water pressure. A pressure differential greater than pressure barrier as determined by the depth of the water therefore is required to force air past the pressure barrier. This pressure barrier blocks the reverse flow of air into chamber 38 because the pressure differential across the pressure barrier is zero at this time.

The oxygen in the air pocket 68 gradually becomes depleted during the filtration cycle. The oxygen-depleted air is bled or purged from the tank 12 via the operation illustrated in FIG. 1B. During this operation, the control valve 14 is switched to its backwash position to open the chamber 38 to the drain port 22 and thus to atmosphere. The resulting pressure differential across the air blocker 100 forces air in the pocket 68 to flow though the fluid in the cup 104, downwardly around the baffle 106, through the passage 38, and into the control valve 14 through the outer inlet/outlet port 26. The purged air then is expelled through the drain port 22 of the control valve 14 and to drain. The depth, if any, of the residual air pocket 68 within the tank 12 at the end of this purge process (now at atmospheric or near-atmospheric pressure rather than being pressurized) depends on factors including the pressure of the source water being admitted to the tank 12 through the riser tube 70 and the time that water flows into the tank 12. In one preferred mode of operation, the tank 12 is completely filled with water and the water flow into the tank 12 through the riser tube 70 is maintained for a time to backwash contaminants from the filter media in the bed 62, past the air blocker 100, through the outer inlet/outlet port 26, through the control valve 14, and out of the drain port 22.

After sufficient air is purged from the pocket 68 and any subsequent backwashing is complete, the control valve 14 is switched to the state shown in FIG. 1C to replenish the air in the pocket 68. Source water flows through the control valve 14 and flows through the air blocker 100. With some variations due to splashing and turbulence, the volume of water in the cup 104 will remain generally unchanged during this flow. The water in the tank 12 is forced upwardly through the riser tube 70 from the bottom opening 74, through the inner inlet/outlet port 28 of the control valve 14, and to the drain port 22.

Air, admitted into the valve 14 via the port 24, also is supplied to the control valve 14 during this operation. The air could be forcefully forced though the valve 14 via a pump, not shown, in which case it would be forced through the air blocker 100 and into the air pocket 68 under pressure. Alternatively, the valve 14 could contain an internal venturi, also not shown, in which case the port 24 would comprise an air induction port. In this event, water flowing through the venturi draws air into the control valve 14 through the air induction port 24. The air then is drawn with the flowing water through the outer inlet/outlet port 26, downwardly past the baffle 106, and out of the cup 104. Thus, as the source water and air flow through the control valve 14 and into the air pocket 68, the tank 12 is filled with air as the water passes out of the drain 22. The air induction cycle is continued to substantially drain the interior volume of the tank 12 of water and to fill the volume of the tank 12 not occupied by filtration media with air. This induction also revitalizes the filter media.

Referring again to FIG. 1A, the process is completed by switching the control valve to the service state in which source water again is directed to the outer inlet/outlet port 26 of the control valve 14, through the air blocker 100, downwardly through the filter media bed 62, upwardly through the riser tube 70, through the inner inlet/outlet port 28, through valve 14, and out of the treated water outlet 20. This water flow fills the interior of the tank 12 with water to the original level shown in FIG. 1A and again traps a head of air in the pocket 68 of the tank 12 as seen in FIG. 1A. Aeration filtration then proceeds as described above.

It should be noted that the filter 10 will spend the vast majority of its time in the service state or aeration modality shown in FIG. 1A. When source water is not being directed through the control valve 14, as is typically the case whenever there is no demand at the outlet port 20 of the control valve 14, the trapped volume water 102 in the air blocker 100 prevents air from flowing into the control valve 14 from the pocket 68 as shown in FIG. 2. Note that the arrows designating airflow stop at the surface of the water in the cup 104. The air blocker 100 thus acts as a P-trap that prevents air in the pocket 68 from backing up into the control valve 14 in much the same manner as a P-trap in a sink or toilet prevents sewer gasses from backing up into the building. Of course, air also cannot flow into the control valve 14 when source water is flowing into the tank 12 because such flow is prevented by the water flow.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some changes to the described embodiments is discussed above. The scope of other changes to the described embodiments that fall within the present invention but that are not specifically discussed above will become apparent from the appended claims.

I claim:

1. A treatment tank for an aeration filter, comprising:
a tank having a peripheral wall, the tank being configured to hold a liquid and to have a pocket formed above an upper surface of the liquid that is configured to contain air at a post-atmospheric pressure, an opening being formed in the tank, a chamber being formed in the tank and being configured to permit air and liquid to flow into and out of the tank through the opening; and
an air blocker that is located in the tank, wherein the air blocker comprises
a plastic cup that is configured to retain a volume of liquid up to a designated level, the cup having an outer wall and a bottom wall, and
a plastic baffle that extends downwardly into the cup beneath the designated level, a flow path being formed around the baffle, the flow path having a first upper portion disposed radially between the baffle and the cup, a second upper portion located radially inwardly of the baffle, and a lower portion that connects the first and second upper portions and that is positioned beneath the designated level, whereby liquid in the cup prevents gas from flowing through the flow path and into the chamber in the tank from the air pocket.

2. The treatment tank as recited in claim 1, wherein the opening in the tank is located in a top end of the tank, and wherein the baffle is tubular and extends downwardly from the opening.

3. The treatment tank as recited in claim 2, wherein the baffle is integrated into a cylindrical element that is contained radially within the cup.

4. The treatment tank as recited in claim 3, wherein the cylindrical element has an annular floor and a cylindrical wall disposed vertically between the bottom of the baffle and the floor, the cylindrical wall having a plurality of circumferentially-spaced openings formed therethrough beneath the baffle, the openings defining the lower-portion of the flow path.

5. The treatment tank as recited in claim 4, wherein the cylindrical element is attached to the cup to form an integrated unit.

6. The treatment tank as recited claim 2, further comprising a control valve that is mounted on top of the tank and that has a downwardly extending fitting that is sealed to a perimeter of the opening, and wherein an upper end of the cylindrical element is sealed to the fitting.

7. The treatment tank as recited in claim 6, wherein the upper end of the cylindrical element is attached to an inner surface of the fitting.

8. The treatment tank as recited in claim 2, further comprising a riser tube that extends downwardly into the tank from the opening, and wherein the cup surrounds and is sealed to the riser tube.

9. The treatment tank as recited in claim 1, where an effective depth of the baffle, as measured by a distance the baffle extends beneath the designated level to which liquid is retained in the cup, is at least 0.25".

10. The treatment tank as recited in claim 1, wherein the first upper portion the flow path is of generally constant inner and outer diameter along an entire extent thereof.

11. An aeration filter comprising:
a tank having
a peripheral wall defining an interior,
an upper opening, and
a vertical riser tube positioned radially centrally of the tank in communication with the upper opening, wherein the interior of the tank has a chamber that is configured to permit air and water to flow into and out of the tank through the upper opening, a lower portion configured to contain water, and an upper portion forming an air pocket;
a control valve mounted on the tank above the upper opening, the control valve having a source water inlet, a treated water outlet, a drain outlet, an air inlet, and first and second inlet/outlets that both open into the tank through the upper opening; and
an air blocker that is located in the tank beneath the upper opening, wherein the air blocker comprises
a plastic cup that is configured to retain a volume of water to a designated level, and
a tubular plastic baffle that extends downwardly into the cup beneath the designated level, a U-shaped flow path being formed around the baffle and being bordered by plastic surfaces of the cup and the baffle along an entire extent thereof, the flow path having a first upper portion disposed radially between the baffle and the cup, a second upper portion located radially between the baffle and the riser tube, and a bottom portion that connects the first and second upper portions and that is positioned beneath the designated level, whereby, when the tank is filled with water to the designated level, water in the cup prevents air from flowing from the air pocket, around the baffle, into the chamber, and into the control valve.

12. The aeration filter as recited in claim 11, wherein the cup has a bottom wall and a peripheral wall having an upper edge, wherein the baffle is integrated into a cylindrical element contained radially within the cup and extending above the upper edge of the peripheral wall of the cup, and wherein the cylindrical element has a floor and a cylindrical wall disposed axially between the bottom of the baffle and the floor, the cylindrical wall having a plurality of circumferentially-spaced openings formed therethrough that collectively from the bottom portion of the U-shaped flow path.

13. The aeration filter as recited in claim 12, wherein the floor is attached to the cup so that the cylindrical element and the cup form an integrated unit.

14. The aeration filter as recited in claim 12, where the integrated unit is attached to the control valve.

15. The aeration filter as recited in claim 11, wherein the first inlet/outlet port is an annular port that surrounds the second inlet/outlet port, and further comprising a riser tube that extends downwardly into the tank from the second inlet/outlet port, and wherein the air blocker surrounds and is sealed to the riser tube.

16. The treatment tank as recited in claim 11, wherein the first upper portion the flow path is of generally constant inner and outer diameter along an entire extent thereof.

17. A treatment tank for an aeration filter, comprising:
a tank having a peripheral wall, the tank being configured to hold a liquid and to have a pocket formed above an upper surface of the liquid that is configured to contain air at a post-atmospheric pressure, an opening being formed in the tank, a chamber being formed in the tank and being configured to permit air and liquid to flow into and out of the tank through the opening; and
an air blocker that is located in the tank, wherein the air blocker comprises
a cup that is configured to retain a volume of liquid up to a designated level, the cup having an outer wall and a bottom wall, and
a baffle that extends downwardly into the cup beneath the designated level, a flow path being formed around the baffle, the flow path having a first upper portion disposed radially between the baffle and the outer wall of the cup and being of generally constant inner and outer diameter along an entire extent thereof, a second upper portion located radially inwardly of the baffle, and extending from a lower edge of the baffle to a height above an upper edge of the cup, and being of generally constant inner and outer diameter along an entire extent thereof, and a lower portion that connects the first and second upper portions and that is positioned beneath the designated level, whereby, when the tank is filled with liquid to the designated level, liquid in the cup prevents gas from flowing into the chamber in the tank from the air pocket.

18. The treatment tank as recited in claim 17, wherein the flow path is bordered along its entire extend by plastic surfaces of the cup and the baffle.

* * * * *